United States Patent
Zhu et al.

(10) Patent No.: US 9,910,942 B2
(45) Date of Patent: Mar. 6, 2018

(54) METHODS AND SYSTEMS FOR SPECIFYING METAL NECKING FAILURE CRITERIA IN FINITE ELEMENT ANALYSIS

(71) Applicant: Livermore Software Technology Corporation, Livermore, CA (US)

(72) Inventors: Xinhai Zhu, Pleasanton, CA (US); Zhidong Han, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 433 days.

(21) Appl. No.: 14/705,295

(22) Filed: May 6, 2015

(65) Prior Publication Data
US 2016/0328502 A1 Nov. 10, 2016

(51) Int. Cl.
G06F 17/10 (2006.01)
G06F 17/50 (2006.01)

(52) U.S. Cl.
CPC ...... *G06F 17/5018* (2013.01); *G06F 2217/42* (2013.01)

(58) Field of Classification Search
CPC .................................................. G06F 17/5018
USPC ............................................................ 703/2
See application file for complete search history.

(56) References Cited

PUBLICATIONS

Hora et al.: A generalized approach for the prediction of necking and rupture phenomena in the sheet metal forming; IDDRG Conference 2012, Mumbai, India, Nov. 25-29, 2012; 17 pp.*

* cited by examiner

*Primary Examiner* — Hugh Jones
(74) *Attorney, Agent, or Firm* — Roger H. Chu

(57) ABSTRACT

Methods and systems for specifying metal necking failure criteria in FEA are disclosed. FEA model contains many finite elements representing a structure, a loading condition and a metal necking failure criteria are received in a computer system. The loading condition includes a loading direction. The metal necking failure criteria includes critical strain and fracture strain values, the neck's width, and a profile of strain values between the critical strain value and the fracture strain value within the neck's width. At each solution cycle in the time-marching simulation of the structure, each finite element is check to determine whether it experiences a metal necking failure, which occurs when each finite element's strain obtained in that solution cycle is greater than an average strain value defined in a formula according to the critical strain and fracture strain values, the neck's width and the profile of the metal necking failure criteria.

15 Claims, 6 Drawing Sheets

```
                                                                    100
```

102 ─┐
```
┌─────────────────────────────────────────────────────────────┐
│ Receive, in a computer system having a FEA application module │
│   installed thereon, a FEA model representing a structure, a  │
│   loading condition and a metal necking failure criteria, the FEA │
│   model containing a plurality of nodes connected by a plurality of │
│   finite elements, the loading condition including at least a loading │
│   direction, and the metal necking failure criteria including critical │
│   strain and fracture strain values, the neck's width and a profile of │
│   strain values between the critical strain value and the fracture │
│           strain value within the neck's width                │
└─────────────────────────────────────────────────────────────┘
```

104 ─┐
```
┌─────────────────────────────────────────────────────────────┐
│ Obtain, with the FEA application module, structural behaviors by │
│ conducting a time-marching simulation of the structure using the │
│ FEA model under the loading condition, at each solution cycle of │
│    a plurality of solution cycles in the time-marching simulation, │
│       checking whether each finite element experiences a metal │
│    necking failure, which occurs when each finite element's strain │
│       value obtained in that solution cycle is greater than a critical │
│      average strain value defined in a formula based on the critical │
│   strain and fracture strain values, the neck's width and the profile │
│                       specified by user                       │
└─────────────────────────────────────────────────────────────┘
```

FIG. 1

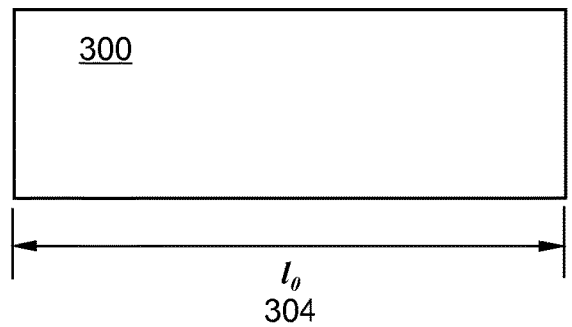
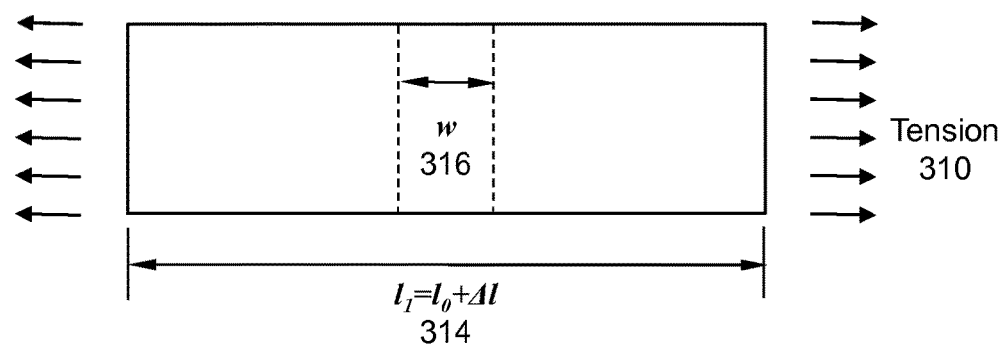
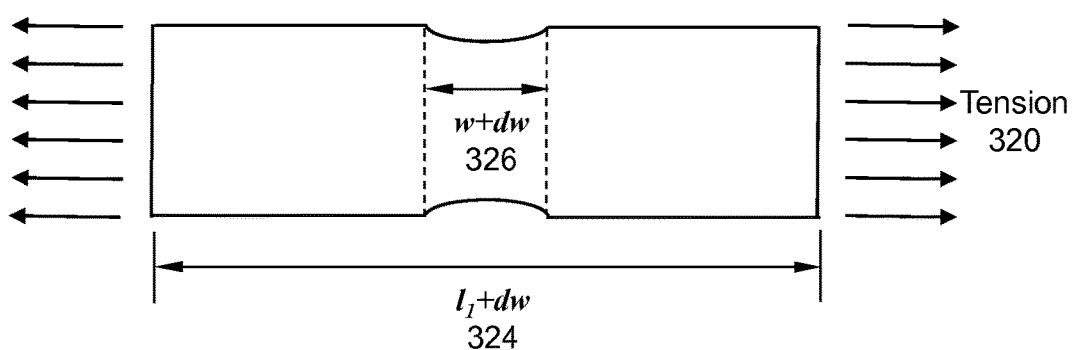
FIG. 3

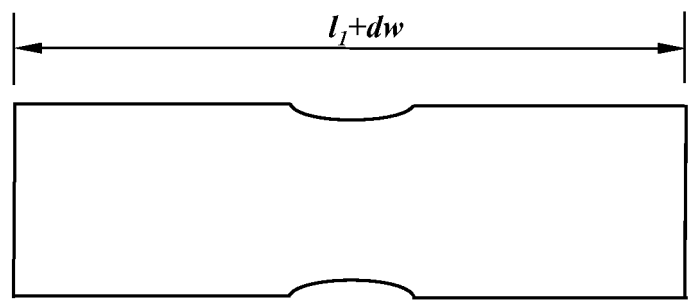
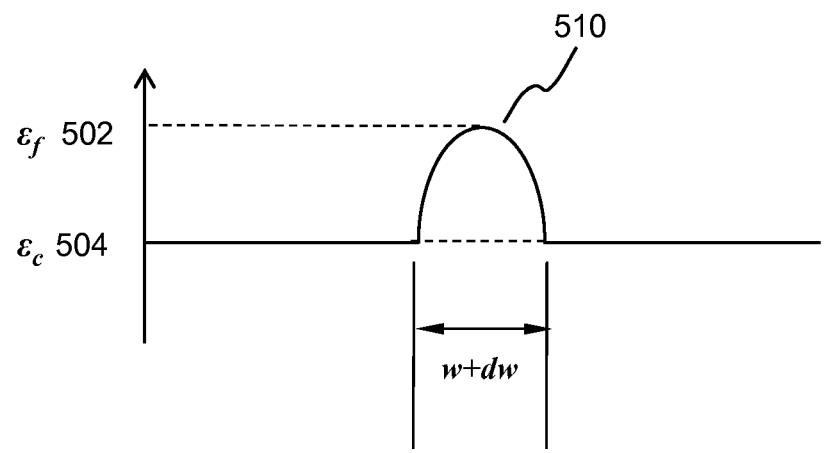
FIG. 5

METHODS AND SYSTEMS FOR SPECIFYING METAL NECKING FAILURE CRITERIA IN FINITE ELEMENT ANALYSIS

FIELD

The present invention generally relates to computer-aided engineering analysis, more particularly to methods and systems for specifying metal necking failure criteria in finite element analysis.

BACKGROUND

Computer aided engineering (CAE) has been used for supporting engineers in many tasks. For example, in a structure or engineering product design procedure, CAE analysis, particularly finite element analysis (FEA), has often been employed to predict structural behavior (e.g., stresses, displacements, etc.) under various simulated loading conditions (e.g., static or dynamic).

FEA is a computerized method widely used in industry to numerically simulate (i.e., model and solve in a computer system) engineering problems relating to complex products or systems (e.g., cars, airplanes, consumer products, etc.) such as three-dimensional non-linear structural design and analysis. FEA derives its name from the manner in which the geometry of the object under consideration is specified. The geometry is defined by elements and nodal points. There are a number of types of elements, solid elements for volumes or continua, shell or plate elements for surfaces and beam or truss elements for one-dimensional structural objects. The geometry of each element is defined by nodal points, for example, a brick or hexahedral element comprising eight corner nodes.

An example of using FEA is sheet metal forming, which has been used in the industry for years for creating metal parts from a blank sheet metal, for example, automobile manufacturers and their suppliers produce many parts using sheet metal forming.

One of the most used sheet metal forming processes is deep drawing, which involves a hydraulic or mechanical press pushing a specially-shaped punch into a matching die with a piece of blank sheet metal in between. Exemplary products made from this process include, but are not limited to, car hood, fender, door, automotive fuel tank, kitchen sink, aluminum can, etc. In some areas of the die, the depth of a part or product being made is generally more than half its diameter. As a result, the blank is stretched and therefore thinned in various locations due to the geometry of the part or product. The part or product is only good when there is no structural defect such as material failure (e.g., cracking, tearing, wrinkling, necking, etc.). In order to produce a part free of these defects, it is critical to design an addendum section between the product design and the binder region.

In order to properly simulate metal necking failure in finite element analysis, a failure criteria is specified by users of FEA. Prior art approaches have been developed from physical metal specimen testing using average strain around the neck in metal necking failure, for example, data obtained basing on average strain measured with strain gauges. As a result, users need to specify a set of metal necking failure criteria that are finite element mesh (element dimension) dependent. These prior art approaches often cause confusions and difficulties for preparing input data and lead to incorrect simulation because users would need to prepare the failure criteria based on these artificial and ad hoc requirement. It would therefore be desirable to have methods and systems for specifying mesh size independent metal necking failure criteria in finite element analysis.

BRIEF SUMMARY

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Methods and systems for specifying metal necking failure criteria in finite element analysis (FEA) are disclosed. According to one aspect, a FEA model representing a structure, a loading condition and a metal necking failure criteria are received in a computer system having a FEA application module installed thereon. The FEA model contains a number of nodes connected by a number of finite elements (e.g., two-dimensional shell finite elements). The loading condition includes at least a loading direction. The metal necking failure criteria includes critical strain and fracture strain values, the neck's width, and a profile of strain values between the critical strain value and the fracture strain value within the neck's width, which are measured and obtained in a metal testing. The critical strain value represents the strain value just before metal necking failure starts.

Structural behaviors are obtained by conducting a time-marching simulation of the structure using the FEA model under the loading condition. At each of a plurality of solution cycles in the time-marching simulation, each finite element is check to determine whether it experiences a metal necking failure, which occurs when each finite element's strain obtained in that solution cycle is greater than an average strain value defined in a formula according to the critical strain and fracture strain values, the neck's width and the profile of the metal necking failure criteria.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 1 is a flowchart illustrating an example process of specifying metal necking failure criteria in finite element analysis, according to an embodiment of the present invention;

FIG. 3 is a series of diagrams showing an example metal under tension in various stages including necking in accordance with an embodiment of the present invention;

FIG. 5 is a diagram showing an alternative example profile of strain values between critical strain and fracture strain values in accordance with an embodiment of the present invention.

DETAILED DESCRIPTION

Figure 2:
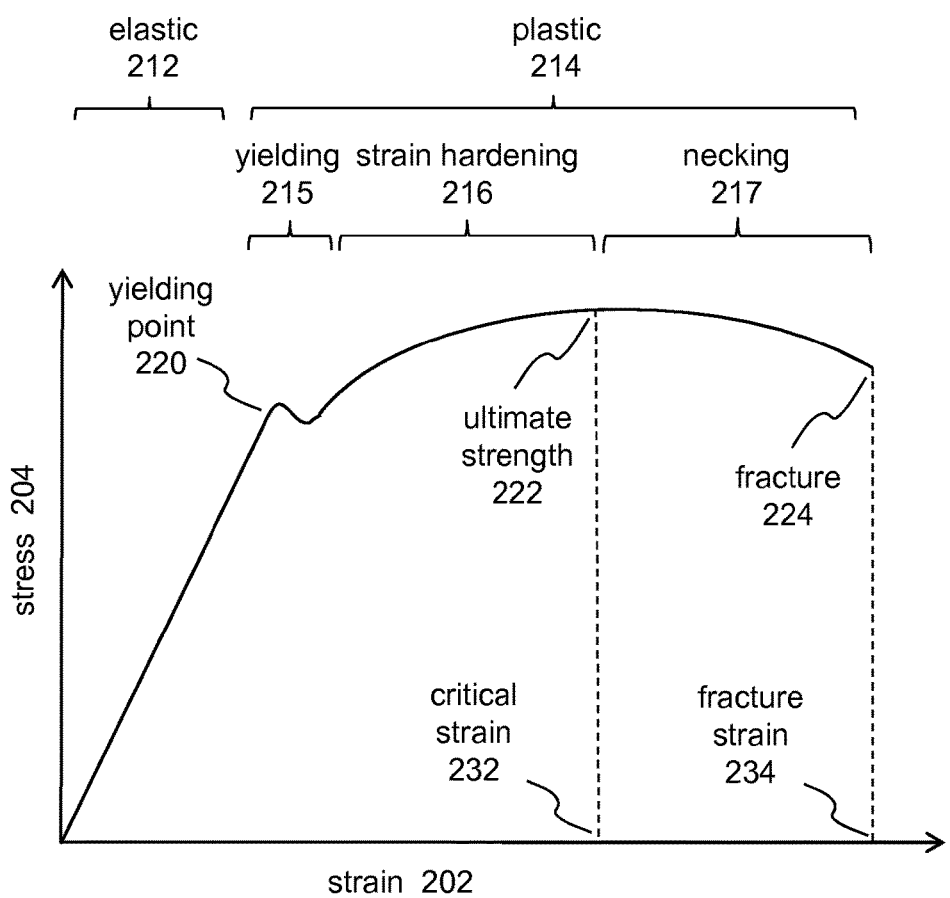
FIG. 2 is a diagram showing a stress-strain relationship of an example metal, according to an embodiment of the present invention.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-6. However, those skilled in the art will readily appreciate that the detailed description given herein with respect to these figures is for explanatory purposes as the invention extends beyond these limited embodiments.

Referring first to FIG. 1, it is a flowchart illustrating an example process 100 of specifying metal necking failure criteria in finite element analysis (FEA) according to one embodiment of the present invention. Process 100 is preferably implemented in software and understood with other figures.

Process 100 starts at action 102 by receiving a FEA model representing a structure, a loading condition and a user-specified metal necking failure criteria in a computer system (e.g., computer system 600 of FIG. 6) having a FEA application module installed thereon. The FEA model contains a number of nodes connected by a number of finite elements (e.g., two-dimensional shell elements for representing sheet metal). The loading condition contains at least a loading direction (e.g., force causing the structure in tension). The user-specified metal necking failure criteria includes necking and fracture strain values associated with the structure (e.g., metal) and a profile of strain values between the necking and fracture strain values.

Next, at action 104, structural behaviors are obtained by conducting a time-marching simulation of the structure using the FEA model under the loading condition with the FEA application module. The time-marching simulation contains a number of solution cycles or time steps. At each solution cycle, each of the finite elements of the FEA model is checking whether it experiences a metal necking failure, which occurs when each finite element's strain obtained in that solution cycle is greater than average strain value defined in a formula according to the critical strain and fracture strain values and the profile of the metal necking failure criteria.

FIG. 2 shows an example stress-strain curve 200, which may be used for determining post-yielding structural behaviors including necking, according to one embodiment of the present invention. The curve 200 has a vertical axis representing stress 204 and a horizontal axis for strain 202. Material has two regions: elastic 212 and plastic 214. Plastic region 214 is further divided into three categories: yielding 215, strain hardening 216 and necking 217. At the top end of the elastic region of the stress-strain curve 200 is a yielding point 220, to which the yielding stress corresponds. The critical strain 232 corresponds to the ultimate strength point 222 and the fracture strain 234 corresponds to the fracture location 224.

FIG. 3 is a series of diagrams showing an example metal under tension. Metal 300 starts with original undeformed dimension $l_0$ 302. As tension 310 increases the metal is stretched by a length $\Delta 1$ to deformed length $l_1$ 314 (i.e., $l_1 = l_0 + \Delta l$) at ultimate strength point right before the necking stage. Also shown in FIG. 3 is the neck width w 316, which is obtained/measured from a physical material testing. At this point, the entire metal experiences the critical strain $\epsilon_c$. Finally when tension 320 further increases, the metal is stretched to the final length $l_1 + dw$ 324 before fracture or failure occurs, and the neck width is increased to a final width w+dw 326.

Figure 4:
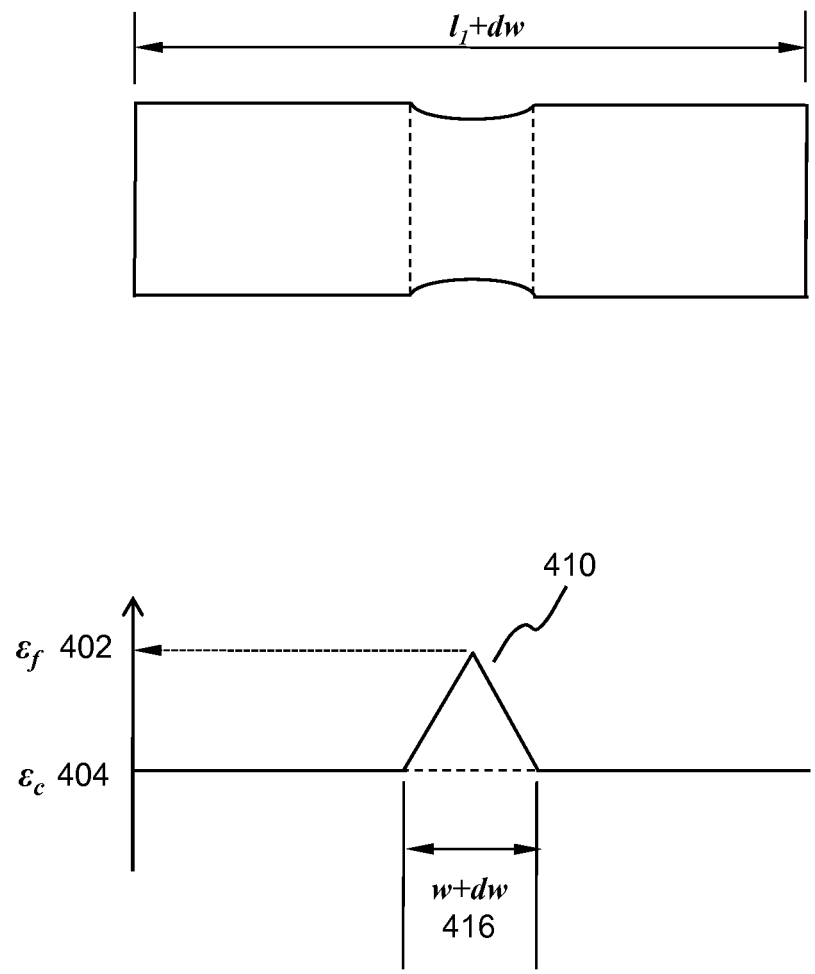
FIG. 4 is a diagram showing an example profile of strain values between critical strain and fracture strain values in accordance with an embodiment of the present invention.

FIG. 4 shows an example profile of strain values between the critical strain value $\epsilon_c$ 404 corresponding to the ultimate strain of the metal and the fracture strain value $\epsilon_f$ 402 corresponding to the metal stretched right before the fracture. The profile has a triangular shape 410 in the neck within the final width w+dw 416 at the fracture. The area of the triangle 410 is $(w+dw)*(\epsilon_f - \epsilon_c)/2$. The average strain value $\epsilon_{average}$ is then calculated as follows:

$$l_1 = l_0 + \Delta l$$

$$\epsilon_c = \ln\frac{l_1}{l_0}$$

$$l_1 = l_0 e^{\epsilon_c}$$

$$\ln\frac{dw}{w} = \frac{\epsilon_f - \epsilon_c}{2}$$

$$dw = w e^{(\epsilon_f - \epsilon_c)/2}$$

$$\epsilon_{average} = \ln\frac{l_1 + dw}{l_0}$$

In an alternative embodiment, a curved profile 510 is shown in FIG. 5. In order to establish an average strain value, the area under the curved profile needs to be calculated.

Figure 6:
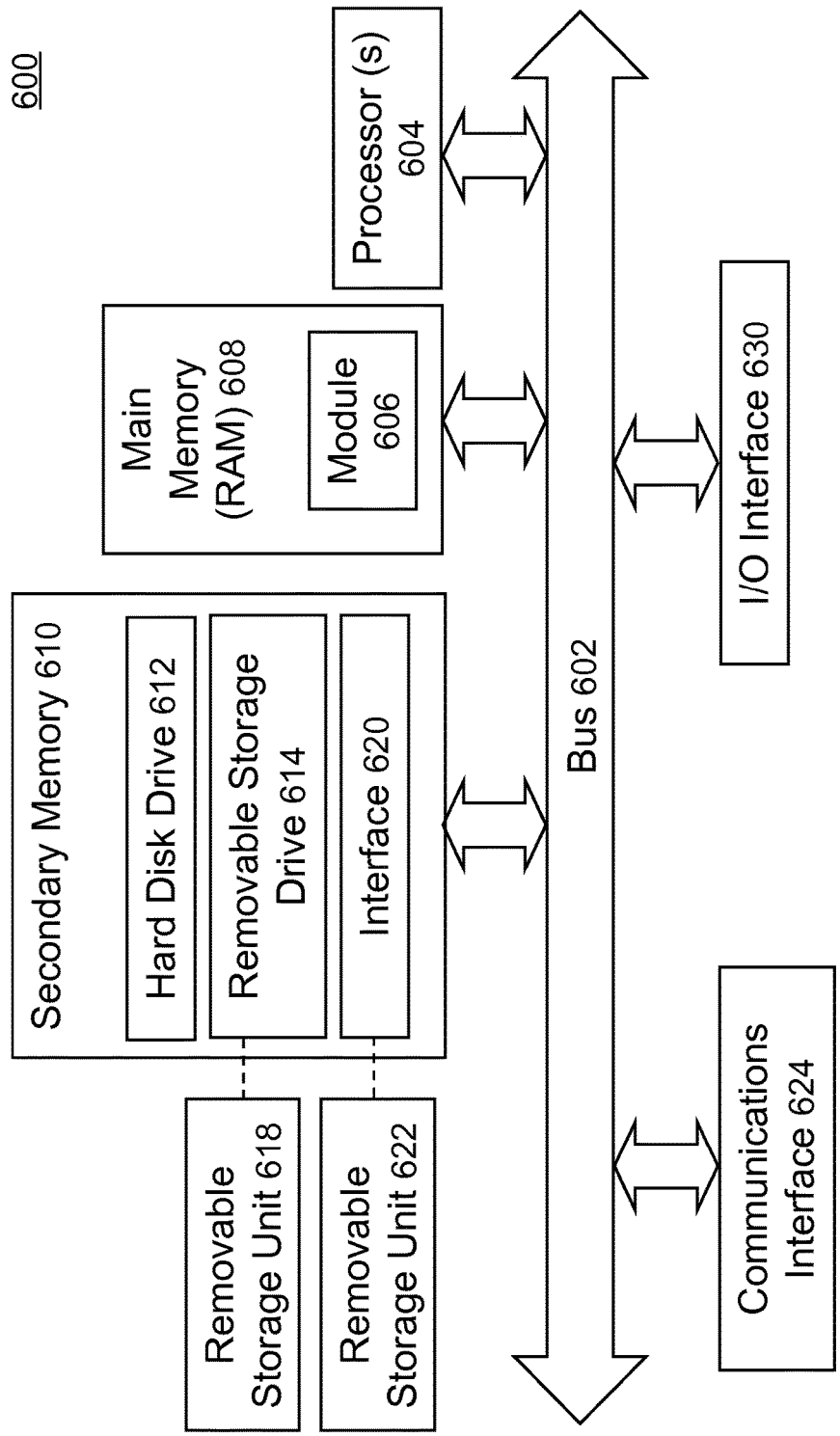
FIG. 6 is a functional block diagram showing salient components of an exemplary computer, in which an embodiment of the present invention may be implemented.

According to one aspect, the present invention is directed towards one or more computer systems capable of carrying out the functionality described herein. An example of a computer system 600 is shown in FIG. 6. The computer system 600 includes one or more processors, such as processor 604. The processor 604 is connected to a computer system internal communication bus 602. Various software embodiments are described in terms of this exemplary computer system. After reading this description, it will become apparent to a person skilled in the relevant art(s) how to implement the invention using other computer systems and/or computer architectures.

Computer system 600 also includes a main memory 608, preferably random access memory (RAM), and may also include a secondary memory 610. The secondary memory 610 may include, for example, one or more hard disk drives 612 and/or one or more removable storage drives 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 622 and interfaces 620 which allow software and data to be transferred from the removable storage unit 622 to computer system 600. In general, Computer system 600 is controlled and coordinated by operating system (OS) software, which performs tasks such as process scheduling, memory management, networking and I/O services.

There may also be a communications interface 624 connecting to the bus 602. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. The computer 600 communicates with other computing devices over a data network based on a special set of rules (i.e., a protocol). One of the common protocols is TCP/IP (Transmission Control Protocol/Internet Protocol) commonly used in the Internet. In general, the communication interface 624 manages the assembling of a data file into smaller packets that are transmitted over the data network or reassembles received packets into the original data file. In addition, the communication interface 624 handles the address part of each packet so that it gets to the right destination or intercepts packets destined for the computer 600. In this document, the terms "computer program medium" and "computer usable medium" are used to generally refer to media such as removable storage drive 614, and/or a hard disk installed in hard disk drive 612. These computer program products are means for providing software to computer system 600. The invention is directed to such computer program products.

The computer system 600 may also include an input/output (I/O) interface 630, which provides the computer system 600 to access monitor, keyboard, mouse, printer, scanner, plotter, and alike.

Computer programs (also called computer control logic) are stored as application modules 606 in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform features of the present invention. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. The application module 606, when executed by the processor 604, causes the processor 604 to perform the functions of the invention as described herein.

The main memory 608 may be loaded with one or more application modules 606 that can be executed by one or more processors 604 with or without a user input through the I/O interface 630 to achieve desired tasks. In operation, when at least one processor 604 executes one of the application modules 606, the results are computed and stored in the secondary memory 610 (i.e., hard disk drive 612). The status of the computer simulation of sheet metal forming process (e.g., finite element analysis results) is reported to the user via the I/O interface 630 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas a formula based on one profile of strain values has been shown and described, other profiles of strain values obtained/measured in a physical metal testing may be used to achieve the same. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of specifying metal necking failure criteria in finite element analysis (FEA) for manufacturing a product or part in a deep drawing metal forming process comprising:
    receiving, in a computer system having a FEA application module installed thereon, a FEA model representing a product or part, a loading condition and a metal necking failure criteria, the FEA model containing a plurality of nodes connected by a plurality of finite elements, the loading condition including at least a loading direction, and the metal necking failure criteria including critical strain and fracture strain values associated with a neck, the neck's width and a profile of strain values between the critical strain value and the fracture strain value within the neck's width, the profile comprising two straight lines forming a triangle;
    obtaining, with the FEA application module, numerically-calculated structural behaviors by conducting a time-marching simulation of the product using the FEA model under the loading condition, at each solution cycle of a plurality of solution cycles in the time-marching simulation, checking whether each finite element experiences a metal necking failure, which occurs when said each finite element's strain value obtained in the time-marching simulation is greater than an average strain value defined by a formula in accordance with the critical strain and fracture strain values, the neck's width and the profile; and
    manufacturing the product in a deep drawing metal forming process based on the numerically-calculated structural behaviors obtained in the time-marching simulation.

2. The method of claim 1, wherein the metal necking failure criteria is obtained from a material testing procedure.

3. The method of claim 1, wherein said formula is as follows:

$$\varepsilon_{average} = \ln\frac{l_1 + dw}{l_0}, dw = we^{(\varepsilon_f - \varepsilon_c)/2}$$

where:
w is the neck's width,
$\varepsilon_c$ is the critical strain value,
$\varepsilon_f$ is the fracture strain value,
$l_0$ is said each finite element's undeformed dimension in the loading direction,
$l_1$ is said each finite element's deformed dimension in the loading direction, and
$\varepsilon_{average}$ is the average strain value.

4. The method of claim 1, wherein said profile comprises one or more curves.

5. The method of claim 1, wherein said metal necking failure occurs in a direction perpendicular to the loading direction.

6. A system for of specifying metal necking failure criteria in finite element analysis (FEA) for manufacturing a product or part in a deep drawing metal forming process comprising:
an input/output (I/O) interface;
a memory for storing computer readable code for a FEA application module;
at least one processor coupled to the memory, said at least one processor executing the computer readable code in the memory to cause the FEA application module to perform operations of:
receiving a FEA model representing a product or part, a loading condition and a metal necking failure criteria, the FEA model containing a plurality of nodes connected by a plurality of finite elements, the loading condition including at least a loading direction, and the metal necking failure criteria including critical strain and fracture strain values associated with a neck, the neck's width and a profile of strain values between the critical strain value and the fracture strain value within the neck's width, the profile comprising two straight lines forming a triangle; and
obtaining numerically-calculated structural behaviors by conducting a time-marching simulation of the product using the FEA model under the loading condition, at each solution cycle of a plurality of solution cycles in the time-marching simulation, checking whether each finite element experiences a metal necking failure, which occurs when said each finite element's strain value obtained in the time-marching simulation is greater than an average strain value defined by a formula in accordance with the critical strain and fracture strain values, the neck's width and the profile; and
whereby the product is manufactured in a deep drawing metal forming process based on the numerically-calculated structural behaviors obtained in the time-marching simulation.

7. The system of claim 6, wherein the metal necking failure criteria is obtained from a material testing procedure.

8. The system of claim 6, wherein said formula is as follows:

$$\varepsilon_{average} = \ln\frac{l_1 + dw}{l_0}, dw = we^{(\varepsilon_f - \varepsilon_c)/2}$$

where:
w is the neck's width,
$\varepsilon_c$ is the critical strain value,
$\varepsilon_f$ is the fracture strain value,
$l_0$ is said each finite element's undeformed dimension in the loading direction,
$l_1$ is said each finite element's deformed dimension in the loading direction, and
$\varepsilon_{average}$ is the average strain value.

9. The system of claim 6, wherein said profile comprises one or more curves.

10. The system of claim 6, wherein said metal necking failure occurs in a direction perpendicular to the loading direction.

11. A non-transitory computer readable storage medium containing computer instructions of specifying metal necking failure criteria in finite element analysis (FEA) for manufacturing a product or part in a deep drawing metal forming process, said computer instructions when executed on a computer system cause the computer system to perform operations of:
receiving, in a computer system having a FEA application module installed thereon, a FEA model representing a product or part, a loading condition and a metal necking failure criteria, the FEA model containing a plurality of nodes connected by a plurality of finite elements, the loading condition including at least a loading direction, and the metal necking failure criteria including critical strain and fracture strain values associated with a neck, the neck's width and a profile of strain values between the critical strain value and the fracture strain value within the neck's width, the profile comprising two straight lines forming a triangle; and
obtaining, with the FEA application module, numerically-calculated structural behaviors by conducting a time-marching simulation of the product using the FEA model under the loading condition, at each solution cycle of a plurality of solution cycles in the time-marching simulation, checking whether each finite element experiences a metal necking failure, which occurs when said each finite element's strain value obtained in the time-marching simulation is greater than an average strain value defined by a formula in accordance with the critical strain and fracture strain values, the neck's width and the profile; and
whereby the product is manufactured in a deep drawing metal forming process based on the numerically-calculated structural behaviors obtained in the time-marching simulation.

12. The non-transitory computer readable storage medium of claim 11, wherein the metal necking failure criteria is obtained from a material testing procedure.

13. The non-transitory computer readable storage medium of claim 11, wherein said formula is as follows:

$$\varepsilon_{average} = \ln\frac{l_1 + dw}{l_0}, dw = we^{(\varepsilon_f - \varepsilon_c)/2}$$

where:
w is the neck's width,
$\varepsilon_c$ is the critical strain value,
$\varepsilon_f$ is the fracture strain value,
$l_0$ is said each finite element's undeformed dimension in the loading direction, $l_1$ is said each finite element's deformed dimension in the loading direction, and $\epsilon_{average}$ is the average strain value.

14. The non-transitory computer readable storage medium of claim 11, wherein said profile comprises one or more curves.

15. The non-transitory computer readable storage medium of claim 11, wherein said metal necking failure occurs in a direction perpendicular to the loading direction.

\* \* \* \* \*